Sept. 15, 1959　　　　　　　R. G. NILL　　　　　　　2,904,270
CLAMPING MECHANISM FOR STATOR WINDING APPARATUS
Filed July 25, 1955　　　　　　　　　　　　　　　4 Sheets-Sheet 4

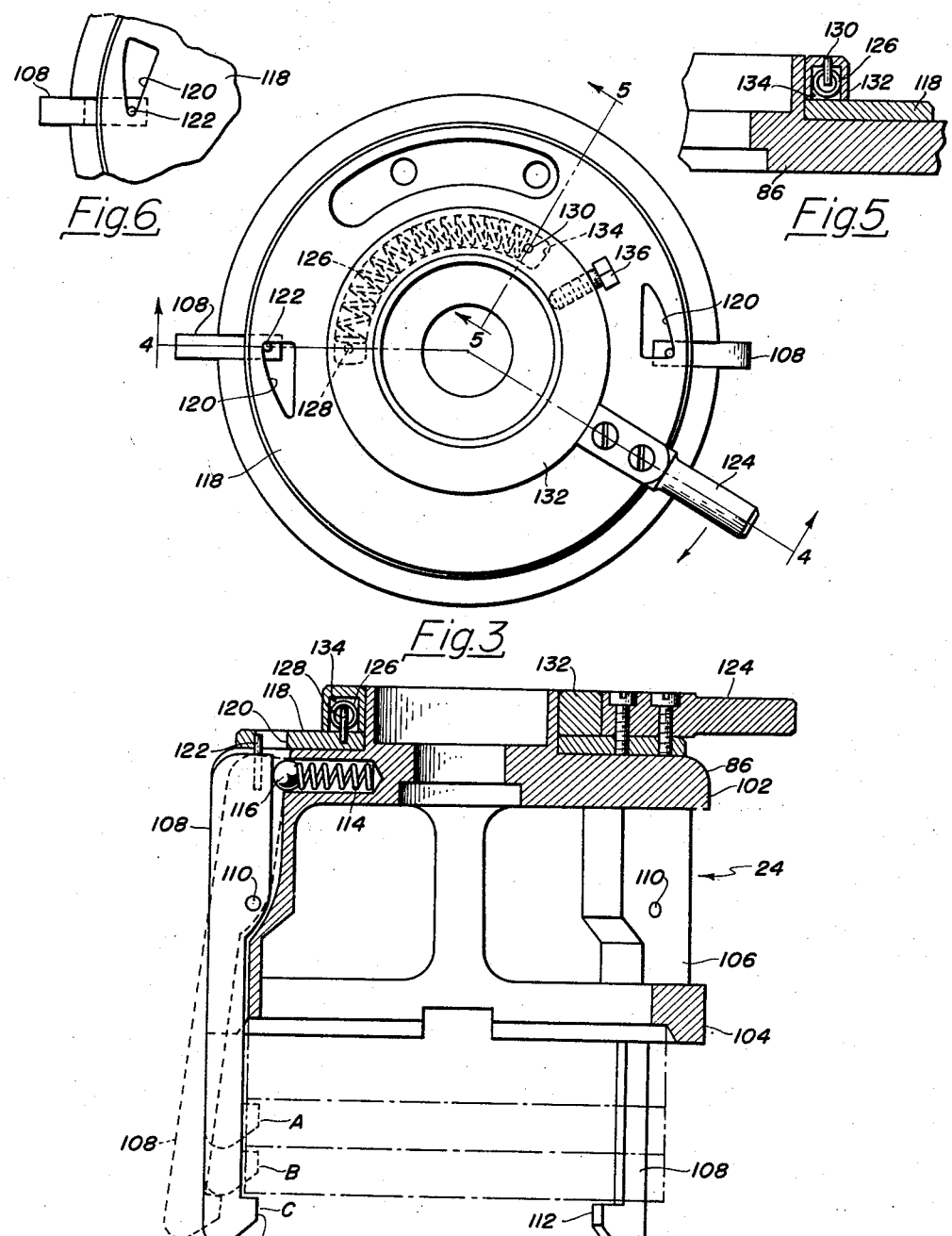

INVENTOR.
RICHARD G. NILL
BY
Lockwood, Galt, Woodard, & Smith
ATTORNEYS

2,904,270

CLAMPING MECHANISM FOR STATOR WINDING APPARATUS

Richard G. Nill, Fort Wayne, Ind., assignor to Fort Wayne Tool, Die & Engineering Company, Fort Wayne, Ind., a company of Indiana Application July 25, 1955, Serial No. 524,083

4 Claims. (Cl. 242—1.1)

This invention relates to a clamping mechanism for use on apparatus adapted to wind stators of electric motors. The invention further relates to a stator-locating winding nest and the combination of said clamping mechanism and winding nest.

In the coil winding apparatus, there is provided a wire-winding element which describes a looped path for winding a coil on one or more poles of a stator. After the winding element completes, for example, winding one pole, it is deactuated, whereupon the stator is indexed for winding a succeeding pole.

The construction and operation of two stator winding machines with which the invention may be used are described in application Ser. No. 479,269, filed January 3, 1955, inventor John F. Lill, and application Ser. No. 506,617, filed May 6, 1955, inventor Robert J. Eminger. These two applications are cited so that their entire disclosures may be considered to be incorporated herein insofar as is necessary in order to obtain a full understanding of this invention.

The machines of the prior applications utilize a winding element having a particular fixed movement path, so that it is necessary to locate the stator exactly in relation to the winding element for obtaining proper winding action.

Accordingly, it is an object of the invention to properly locate the stator in relation to the fixed path of movement of the winding element.

It is another object of the invention to locate the proper stator position with facility and accuracy in order to reduce time between winding cycles.

Another object of the invention is to provide a number of removable shrouds or templates, one for each stator pole, which assist in shaping the coils and which also provide lateral support to prevent the coils from spilling when a coil wire lead is pulled.

A further object of the invention is to construct a clamping member which holds the stator within the winding nest and further permits rotation of the stator.

It is an additional object of the invention that the stator be releasably fastened to the clamping member so it can be withdrawn from the winding nest and then released from the clamping member.

In addition to the foregoing structural and operational features of the invention, it is my overall objective to provide an economical and highly efficient apparatus which will enable manufacture of quality stators at low cost and at a high productive rate.

Other objects and features will become evident from a consideration of the following description which refers to the accompanying drawings, wherein:

Fig. 3 is a top view of the clamping mechanism;

Figure 8:
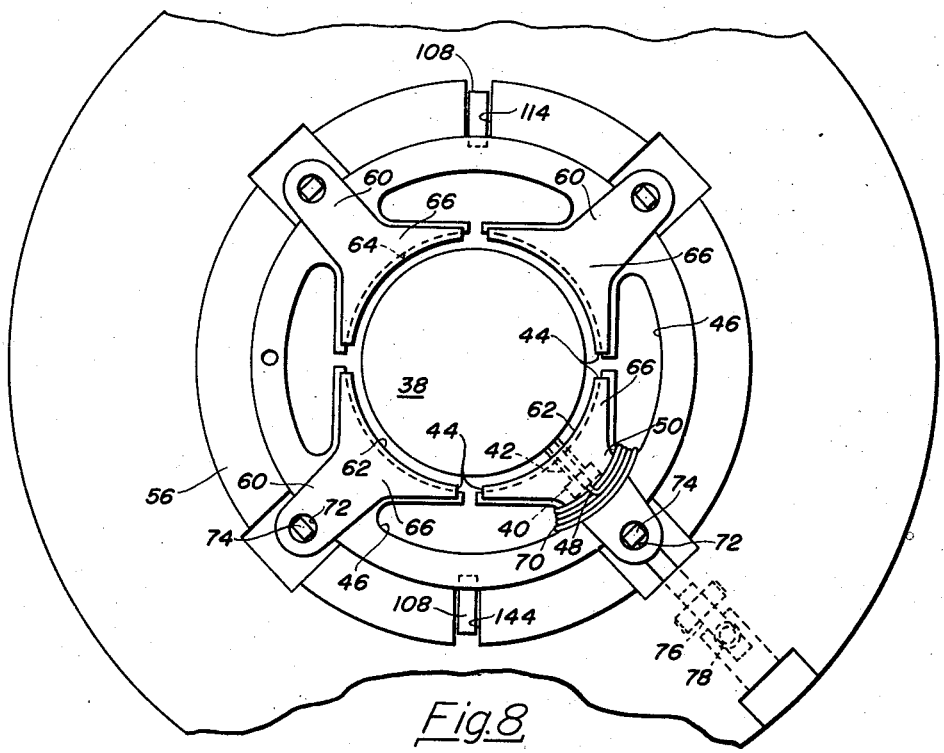
Figure 7:
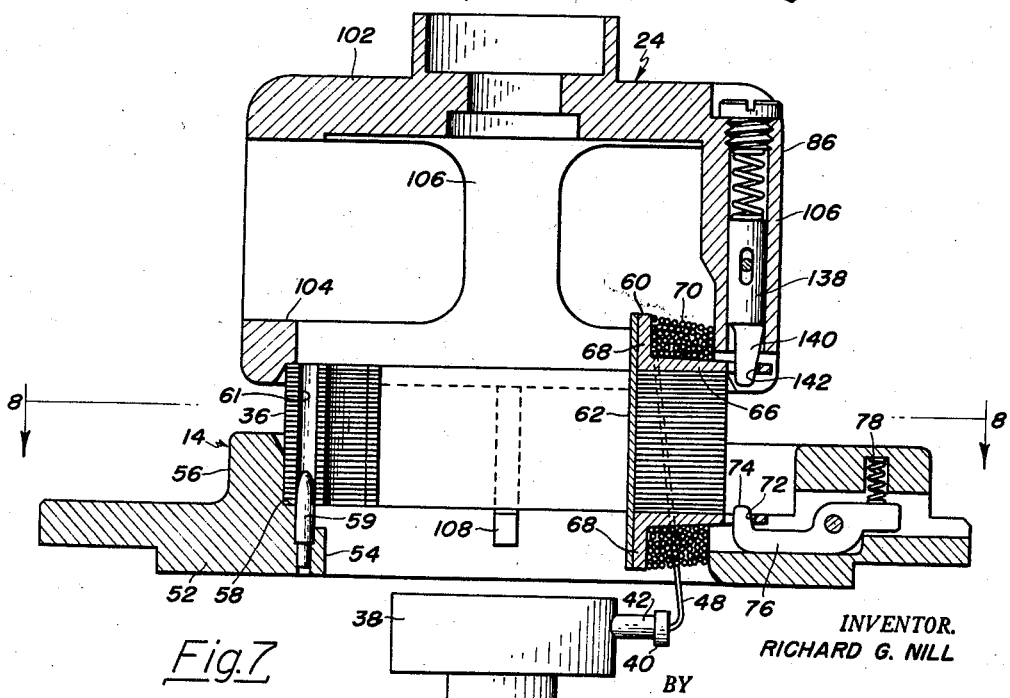

Figs. 4 and 5 are section views taken respectively on lines 4—4 and 5—5 of Fig. 3;

Fig. 6 is a fragmentary view of the cam arrangement shown in Fig. 3 when the stator is being released;

Fig. 7 is an enlarged sectional view of the rotatable portion of the clamping head bearing against a stator in the winding nest; and, Fig. 8 is a top view of a stator in the winding nest with one of the poles of the stator partially wound.

Figure 1:
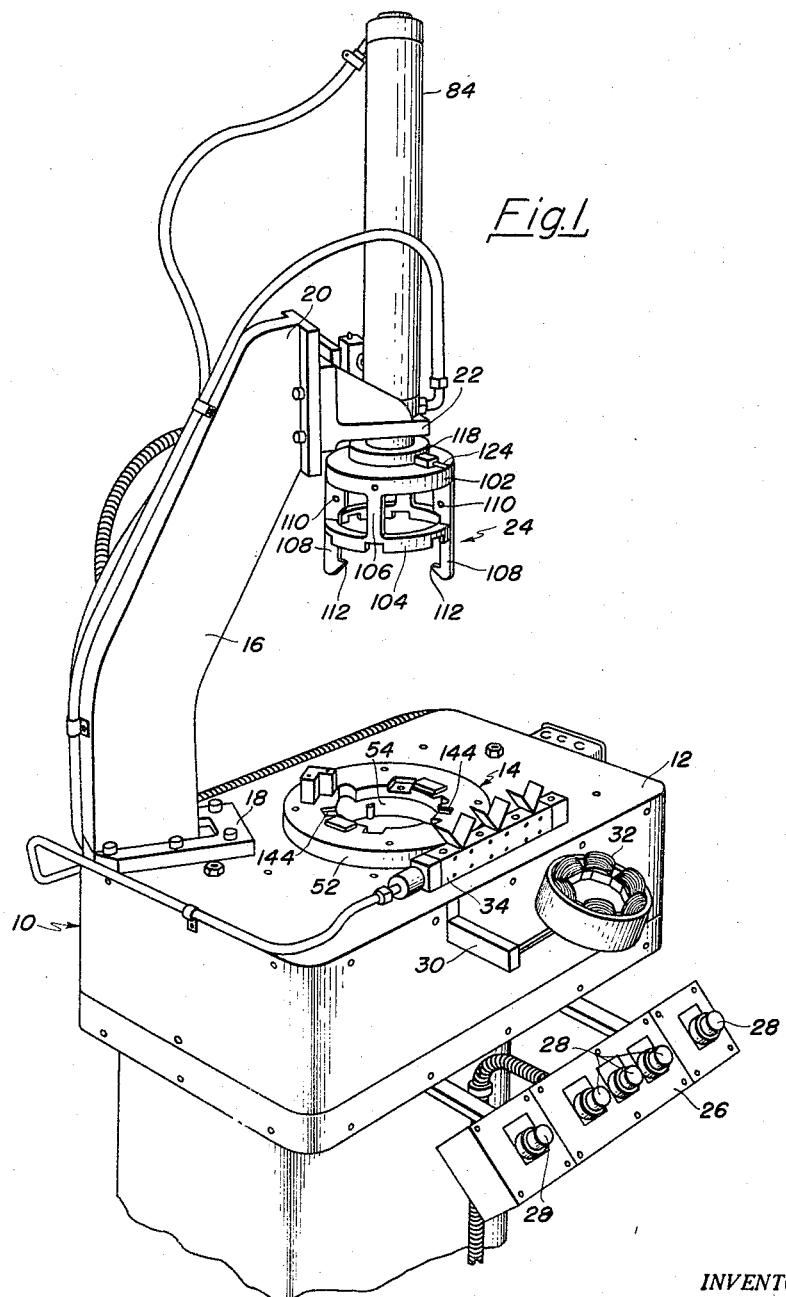
Fig. 1 is a perspective view of the stator winding appartus with the base shown broken away.

Referring to Fig. 1, the stator winding apparatus is designated generally by reference numeral 10.

The stator winding apparatus has a horizontal supporting platform 12 with a winding nest 14 disposed approximately centrally of the supporting platform.

An upstanding arm 16 is secured at the base 18 to platform 12. The supporting arm 16 is offset so that the upper end 20 of the support arm overlies the center of the platform 12. A bracket 22 is fastened to arm end 20, and a clamping mechanism 24 is carried by the bracket 22. The clamping mechanism 24 is directly over the winding nest 14 so that they are in vertical alignment.

A control panel 26 is located at one side of the apparatus where the operator is stationed during machine operation. The control panel has a number of switches 28 which are used to control machine operation.

A receiving nest 30 is mounted on the same side of the machine as control panel 26 to receive a wound stator 32. When the stator is positioned in the receiving nest, the wire trailing from the wound stator is drawn across a cutting device 34 which severs the wire. The cutting device is fully described in the previously cited Lill application.

The two subassemblies, winding nest 14 and clamping mechanism 24, are of primary interest. These subassemblies will be considered first separately and their relationshisp will then be considered from the standpoint of machine operation.

Winding nest

The purpose of the winding nest 14 is two-fold. First, it supports the stator 36 (Fig. 7), and secondly, it locates the stator 36 with respect to the clamp 24 and winding head 38 (Fig. 7). It is necessary to locate the stator precisely since various slots and openings in the stator are constructed to coincide with the trajectory of winding element 38.

The winding element 38 first moves vertically upwardly from the position shown in Fig. 7, it next pivots horizontally in one direction (Fig. 8), moves vertically downwardly and then swings horizontally to complete a closed path of rectangular configuration. The needle 40 (Figs. 7 and 8) is proportioned so that needle stem 42 passes through stator gaps 44 and into slots 46. Wire 48 is drawn out of the end of the needle 40 and is coiled around pole 50 of the stator.

It will thus be seen that the needle 40 has a regularized trajectory and it is necessary to allow for this movement both by construction and location of the stator in order to prevent damage to the needle during operation of the winding element.

The vertical location of the stator is fixed by means of a rotatable base 52. The base 52 has an opening 54 through which the winding element moves up and down (Fig. 7). A centering ring 56 is located on the base 52 to locate the stator 36 horizontally. The stator 36 is fitted within the centering ring 56 and positioned against shoulder 58. This horizontal and vertical positioning of the stator is sufficient to locate it properly relative to the opening 54, but it is now necessary to fix the circumferential position of the stator so that gaps 44 (Fig. 8) will register with the line of movement of the needle stem 42. This is accomplished by means of a locating pin 59 in the rotatable base 52 and extends into an opening 61 in the stator 36.

A C-shaped cross-section template 60 is associated with each of the poles 50 of the stator. The upright side 62 of the template extends through opening 64 of the stator and has a curvature (Fig. 8) enabling it to fit tightly against the radially innermost part of the stator.

The template 60 has two tapered legs 66 (Fig. 8) which embrace opposite sides of the pole 50. The template side 62 is extended in length to provide flanges 68 for supporting turns of wire 70 (Fig. 7) on the pole. The shape of the turns 70 is determined by the tapered legs 66, since the coils are wound around the legs 66. The lower leg 66 has an opening 72 which receives therein the turned up end 74 of a pivoted locating lever 76. The lever 76 is biased by a spring 78.

*Clamping mechanism*

The clamping mechanism 24 (Fig. 2) includes a first annular member 80 which is carried on the end of a plunger 82 of an air cylinder 84, and a second member 86 which is rotatably suspended on said first member 80 by means of a stud bolt 88. Between the first and second member is a bearing 90. Annular member 80 is held against rotation by means of a plate 91 fastened thereto and a guide post 92 which passes through an opening 94 in bracket 22 and is slidable therein. Note that guide post 92 does not clear the opening when the clamping head is brought to its lowermost position (Fig. 2).

A second guide post 96 is attached to the rotatable second member 86. The guide post 96 is slidably received in opening 98 of a bushing 100 carried by bracket 22. The post 96 holds member 86 against rotation when the clamping mechanism is raised so that post 96 extends into opening 98. But when the clamping mechanism is completely lowered, the post 96 clears the bottom of bushing 100 to permit rotation of the member 86.

Figure 2:
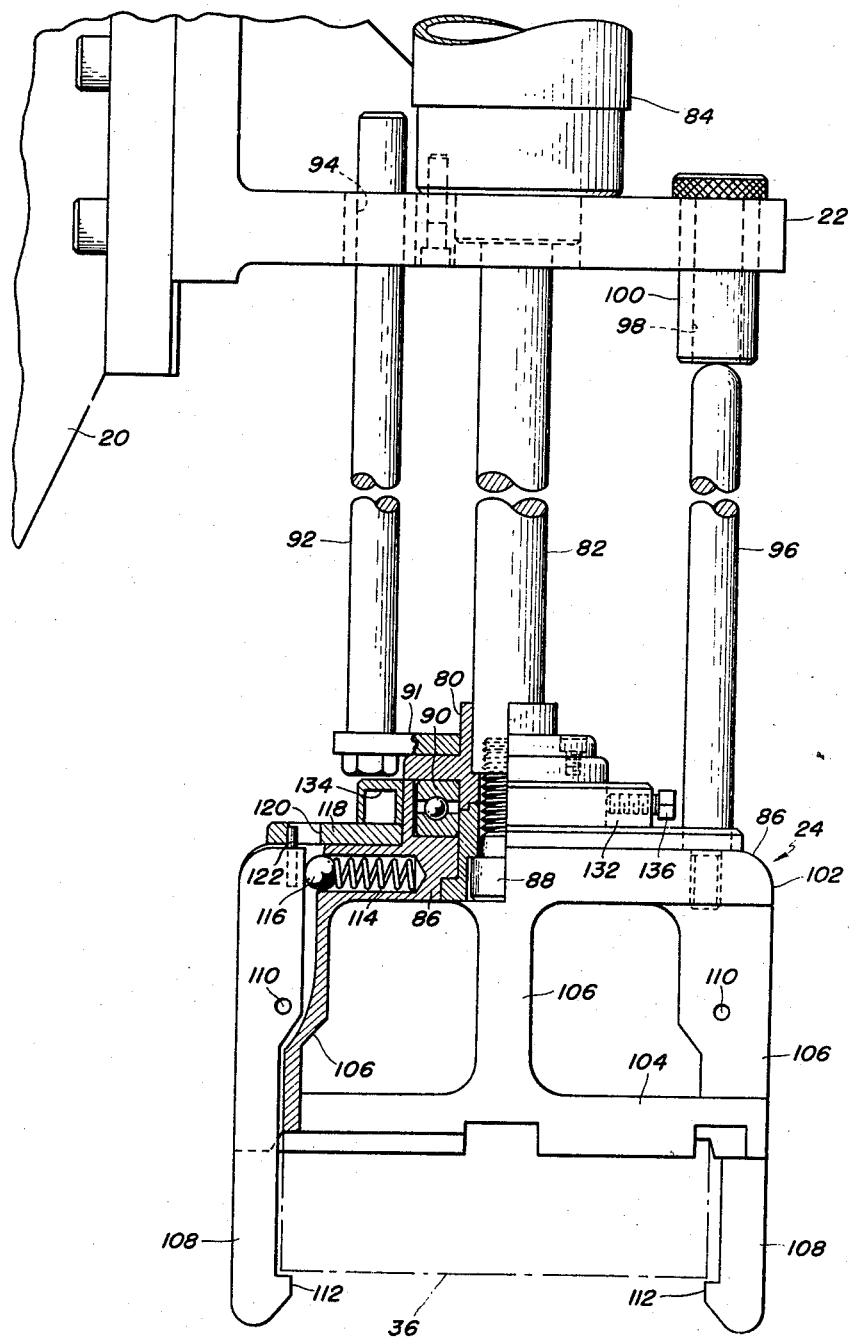
Fig. 2 is a detail view of the clamping mechanism with the left-hand portion thereof being shown in section taken through one of the locking members.

The rotatable second member 86 of the clamping mechanism has an upper ring 102 and a lower ring 104 which seats against the top side of the stator 36 (Figs. 2, 4 and 7). Vertical braces 106 connect the upper and lower rings 102 and 104. Two of the braces are grooved to receive depending locking members or fingers 108 which are mounted on pivots 110 and are provided with hooks 112 at the bottom ends thereof. Each locking finger is biased to a normally "locking" position shown in Figs. 1, 2 and 4 by means of a compressed spring 114 and an intermediate ball 116.

The hooks 112 on the locking members are cammed outwardly by engagement with the outer surface of the stator during downward movement of the clamping mechanism (see dotted line reference numeral 108, Fig. 4).

The locking members 108 may also be moved outwardly by means of a circular cam plate 118 having a generally triangular cam slot 120 and a cam follower 122 secured to the end of the locking fingers 108 (Figs. 2, 3 and 4).

The cam plate 118 is turned by a handle 124 (Figs. 1 and 4), and is normally held in the position indicated in Fig. 3 wherein pin 122 bottoms in the slot 120. The plate 118 is urged to this position by a compressed spring 126 which bears at one end against a pin 128 secured to the plate 118 (Figs. 3 and 4) and at the other end against pin 130 secured to an annular member 132 (Figs. 3 and 5). The compressed spring 126 is fitted into an arcuate slot 134 of the annular member 132. The annular member is fastened to member 86 by means of a set screw 136 (Figs. 2 and 3). Thus, when the clamping mechanism 24 is withdrawn and member 86 is held against rotation, the annular member 132 is held against rotation.

Also received in vertical braces 106 are spring biased plungers 138 which have tapered ends 140 extending into openings 142 in the legs 66 of the templates 60. These plungers are aligned with levers 76 to locate the template 62 in relation to the pole 50 of the stator.

When the clamping mechanism is withdrawn, the registry of guide post 96 with opening 98 ensures a definite circumferential location of the clamping mechanism (Figs. 1 and 2). This clamping mechanism position is such that the depending locking members 108 are aligned with slots 144 in the winding nest (Figs. 1 and 8). Thus, hooks 112 can be passed to a level below the bottom of the stator 36 where they lock against the underside thereof (Figs. 2, 4 and 7).

*Operation*

The stator is prepared for the winding operation by fitting a template 60 over each of the poles 50. The templates are held in this position by means of a wooden plug (not shown) which fills the center of the stator.

At the start of the winding operation, the prepared stator is placed in the winding nest 14, the bottom part of the stator bearing against shoulder 58 (Fig. 7). Since the stator is fitted within the centering ring 56 and bears against shoulder 58, its spatial location is determined both vertically and horizontally in relation to the winding element 38. One further locating consideration is the determination of the circumferential attitude of the stator. The stator is fixed in this sense by turning it until locating pin 59 enters stator opening 61 (Fig. 7).

The plug is now removed and the templates are held in place by means of the pivoted levers 76. The operator next presses one of the switches 28 on the control panel 26 to start machine operation. The air cylinder 84 is actuated through a power source (not shown), causing the plunger 82 and clamping mechanism 24 to move downwardly. This vertically downward movement of the clamping mechanism is guided by posts 92 and 96 which prevent circumferential movement of the clamping mechanism during its descending movement.

The guide posts 92 and 96 ensure vertical alignment of the depending locking members 108 with slots 144 in the winding nest 14 (Fig. 8).

When the hooks 112 of the locking members 108 contact the stator in the winding nest, the locking members are turned on pivots 110 so that the hook ends of the locking members swing away from the stator (Fig. 4). This turning movement of the locking members is opposed by springs 114 so that when the hooks 112 reach a level below the underside of the stator they return to their original position. The hooks are now in position to engage the underside of the stator so that the stator is locked with the clamping mechanism 24.

It will be noted in Fig. 4 that the length of the locking member 108 is so dimensioned that when the clamping mechanism 24 engages the top of the stator, the hook 112 is located at a point slightly below the underside of the stator. The length of the locking member 108 can be varied according to the size of the stator. As indicated in Fig. 4, the clamping mechanism is provided with longer locking members 108 depending upon the height of the stator.

When the clamping mechanism 24 is brought downwardly, the spring biased plungers 138 (Fig. 7) extend into openings 142 of the templates 60 so that template position is adequately fixed during the stator winding operation.

The winding element 38 is then actuated and it begins to describe the looping movement which forms coils of wire on the poles of the stator. As previously stated, the trajectory of the winding needle 40 is predetermined, thus making it necessary to locate the stator in accordance with this trajectory. To prevent damage to the winding needle, it is necessary that the gaps 44 on either side of the pole coincide with the vertical movement of the winding needle 40. It is further required to fix the horizontal and vertical position of the stator so that the looping movement of the needle 40 will be concentric with the pole of the stator. The combined locating functions of the winding nest 14 and locating pin 59 establish this proper positioning of the stator.

The force of the clamping mechanism 24 causes the stator to seat positively within the winding nest against shoulder 58. The force of the clamping mechanism ensures proper location of the stator throughout the winding process. When the pole is wound, the winding nest 14 rotates (indexes) so that an adjacent pole is moved into the position previously occupied by the wound pole. Winding operation is then resumed and continued until this pole is completely wound. The described cyclic operation is continued until all the poles on the stator are completely processed.

The clamping mechanism 24 is maintained in clamping engagement with the stator during its rotative (or indexing) movement with the winding nest. This is possible since the member 86 which engages the stator is rotatable relative to member 80.

When the first pole is wound, guide post 96 is in vertical alignment with opening 98 but a slight clearance is provided betwene the post 96 and bushing 100 which permits rotation of the member 86. When the stator is completely wound, the guide post 96 has turned 360°, so that its final position is the same as its initial position, viz., in vertical alignment with opening 98.

The air cylinder 84 is then operated to raise the clamping mechanism 24, the guide post 96 passes through opening 98 to define the final circumferential position of the clamping mechanism 24. When the guide post 96 enters opening 98, further rotation of member 86 is prevented.

As the clamping mechanism 24 moved upwardly, the stator is lifted out of the winding nest by the locking members 108.

As the wound stator is lifted, wire 48 (Fig. 7) is drawn out of the winding needle 40 of the winding element 38, thus forming a trail of wire between the winding element 38 and the elevated stator.

The template 60 on the last wound stator prevents coils of wire from spilling off of the pole. This contingency must be provided for because tension on the wire 48 can exert a force tending to pull coils of wire off the pole. This is prevented, however, since they are now reinforced by flanges 68 (Fig. 7). When elevated to the position in Fig. 1, all components of the clamping mechanism are held against rotation except the cam plate 118 which is turned by handle 124 to release the wound stator from the clamping mechanism 24.

As the handle 124 is turned clockwise (Fig. 3) the spring 126 is compressed between pin 128 of the plate 118 (Fig. 4) and pin 130 in fixed annular member 132 (Fig. 5). Referring to Figs. 3, 4 and 6, turning the plate 118 causes cam slot 120 to move angularly relative to the cam followers 122. As the cam slots 120 move from the position shown in Fig. 3 to that shown in Fig. 6, the cam followers 122 are pulled toward the center of the clamping mechanism, thus producing turning of the locking members 108 on pivots 110. The hooks 112 are thus swung outwardly to the dotted position shown in Fig. 4 so that the wound stator drops out of the clamping mechanism.

When the handle 124 is released, the plate 118 is returned to its original position by the compressed spring 126, thus permitting the springs 114 to swing the locking members 108 back into locking position (Fig. 2).

The wound stator is placed in the receiving nest 30 and the trail of wire is severed by the cutting device 34. The templates 60 are removed by pulling them inwardly toward the center of the stator. The legs 66 of the templates 60 are tapered to facilitate their withdrawal from the surrounding coils of wire on the respective poles. The coils of wire are now shaped according to the form of the templates and there is no longer any need to support the coils of wire against spillage from the poles.

Although the invention has been described in conjunction with but a single selected embodiment, it will be understood by those skilled in the art that various modifications and changes are possible without departing from the underlying principles of the invention. I intend to include within the scope of the following claims all variations and revisions which embody the principles of the invention.

What is claimed is:

1. In a stator winding apparatus, a winding nest including means for defining the position of the stator which is to be processed, a vertically movable clamping mechanism for holding the stator within the winding nest, a device mounted on said clamping mechanism which locks the stator to the clamping mechanism whereby the stator is withdrawn from the winding nest when the clamping mechanism is raised, said device including depending members yieldably urged in locking position, templates having legs embracing the pole areas of said stator, and a series of circumferentially spaced retaining members which are vertically aligned in said winding nest and clamping member respectively to hold said templates on the poles of the stator during winding thereof.

2. A clamping head structure for use in a stator winding apparatus of the type having a winding nest adapted to rotate a stator through an indexing path, said structure comprising a supporting bracket adapted to support a clamping head in overlying relation to the winding nest, said clamping head being adapted to clamp a stator in said winding nest and to withdraw the stator therefrom, an actuator, said clamping head being vertically movable by said actuator between a lowermost position and an uppermost position, said clamping head including a carrier member and a rotatable thrust member which is carried by said carrier member and bears against the stator to rotate therewith as the stator is indexed, means for preventing rotation of said thrust member when said clamping head is in its uppermost position but permitting rotation of the thrust member when said clamping head is in its lowermost position, said last mentioned means comprising a vertically disposed guide member adapted to extend freely through said supporting bracket, said guide member being secured to said thrust member and removed from the bracket when the clamping head is in its lowermost position.

3. In a stator winding apparatus, a rotatable winding nest for receiving a stator, said winding nest including a base with an opening therein which locates the stator vertically and a centering ring which disposes the stator in a horizontal plane in relation to the opening in said base, locating means which fix the stator in a circumferential position, and an overhead clamp which is vertically displaceable by an air cylinder to engage the stator and to clamp the stator in said winding nest, a plurality of templates which are angularly spaced on the poles of the stator, means carried by said winding nest and said clamp to retain the templates in position, said overhead clamp comprising a fixed portion and a rotatable portion carried thereby and adapted to contact the stator, a plurality of pivoted locking elements depending from said clamp which are biased into stator-locking position, said locking elements having portions extending below the stator when said rotatable portion of said clamp contacts the stator, said locking elements being adapted to pick the stator from the winding nest when the clamp is raised, and means for manually releasing the stator from the clamp when in raised position.

4. A clamping head for use in a stator winding apparatus adapted to clamp a stator for indexing in a winding nest and to withdraw the stator from the winding nest, said clamping head comprising an air cylinder, a supporting bracket, a carrier member which is vertically displaceable by said air cylinder between a lowered and an elevated position, a rotatable thrust member which is carried by said carrier member and engages the stator to rotate therewith as the stator is indexed, means for lifting the stator out of its winding position and raising it to an elevated level when the carrier member is moved to its elevated position, said last mentioned means being pivotally mounted on and depending from said rotatable thrust member and yieldably held in stator-lifting position, two vertically disposed guide members adapted to extend freely through said supporting bracket, one guide member being secured to said carrier member and the other connected to said rotatable thrust member and removed from the bracket when said carrier member is in lowered position to permit indexing rotation of the stator, and means for releasing the elevated stator from said stator-lifting means, said last mentioned means including a cam, a turning lever attached to said cam, a cam follower secured to said stator-lifting means and arranged to produce displacement thereof responsive to turning of said cam, and means for holding the lever, cam and cam follower in predetermined relation.

References Cited in the file of this patent
UNITED STATES PATENTS

| | | |
|---|---|---|
| 1,871,970 | Emmert | Aug. 16, 1932 |
| 2,445,937 | Carpenter | July 27, 1948 |
| 2,551,521 | Anderson et al. | May 1, 1951 |
| 2,579,585 | Klinksiek | Dec. 25, 1951 |
| 2,594,707 | Allen | Apr. 29, 1952 |
| 2,770,424 | Grove | Nov. 13, 1956 |